US005528808A

United States Patent [19]

Holubek et al.

[11] Patent Number: 5,528,808

[45] Date of Patent: Jun. 25, 1996

[54] WIRE INSTALLATION TOOL

[75] Inventors: Paul J. Holubek, North Cohocton; Betty J. Curtis, Rochester; Frank R. Walsh, Webster, all of N.Y.

[73] Assignee: Xerox Corporation, Stamford, Conn.

[21] Appl. No.: 114,256

[22] Filed: Aug. 30, 1993

[51] Int. Cl.$^{6}$ .................... B23P 19/04

[52] U.S. Cl. .................... 29/227; 29/241; 29/433; 29/758

[58] Field of Search .................... 29/173, 225, 226, 29/227, 229, 241, 433, 758, 33 F; 81/64, 442, 448, 486; 250/324

[56] References Cited

U.S. PATENT DOCUMENTS

| | | | |
|---|---|---|---|
| 1,843,866 | 2/1932 | Chapman | 29/227 |
| 1,889,167 | 11/1932 | Anderson | 29/227 |
| 2,360,054 | 10/1944 | Haas | 29/227 X |
| 3,499,143 | 3/1970 | Martin | 250/49.5 |
| 4,099,219 | 7/1978 | Laing | 361/230 |
| 4,110,811 | 8/1978 | Hubble, III et al. | 361/225 |
| 4,112,298 | 9/1978 | Weikel, Jr. | 250/324 |
| 4,118,751 | 10/1978 | Hubble, III et al. | 361/220 |
| 4,258,258 | 3/1981 | Laing et al. | 250/324 |
| 4,330,916 | 5/1982 | Dannatt | 29/227 |
| 4,754,305 | 6/1988 | Fantuzzo et al. | 355/3 CH |
| 4,764,675 | 8/1988 | Levy et al. | 250/324 |
| 5,074,484 | 12/1991 | Kray | 242/129.8 |

FOREIGN PATENT DOCUMENTS

| | | | |
|---|---|---|---|
| 401147 | 7/1909 | France | 29/227 |
| 3740465 | 2/1989 | Germany | 29/227 |

*Primary Examiner*—Peter Vo

[57] ABSTRACT

An installation tool for stringing a tensioned wire between an anchor point and a retaining point, including a sleeve having a slidably mounted pin inside. A tip of the pin holds a loop end of the tensioned wire (such as a coronode in a corotron wire assembly), and protrudes from an end of the sleeve. When the tip holding the loop end of the tensioned wire is placed adjacent to a retaining pin, and the tip is retracted into the sleeve, the loop end of the wire slides onto the retaining pin, where it may rest in a securing notch. A spring may be used to bias the tip of the pin to retract or protrude from the end of the sleeve positioned adjacent to the retaining point. An end of the pin protruding from the sleeve end opposite the retaining point may be used independently or in cooperation with a biasing spring to move the tip of the pin into and out of the sleeve. The sleeve may include gripping areas and or finger loops to permit the user to accurately manipulate the tool. Delicate coronode wires in printers and copiers as well as other spanning wires can be readily installed or replaced using the wire installation tool of the present invention.

2 Claims, 8 Drawing Sheets

WIRE INSTALLATION TOOL

The present invention relates generally to a tool for installing a wire between two or more points and, more particularly, concerns a tool for stringing a tensioned wire (such as a corotron in a copier or printer) between an anchor point and a retaining pin.

Many devices, such as electrostatic copiers and printers, often employ one or more fine conductive wires that must be installed between two or more points or members. In the case of corotron wires and the like, the wire must often be tensioned against a spring bias as it is installed. The delicate operation of installing fragile wires can be difficult for a number of reasons, including the need to avoid damaging, overtensioning or breaking the wire as it is strung between the required points. The ends of the wire can be difficult for the installer to grasp, in many cases leading to multiple unsuccessful attempts to engage an undamaged wire between the retaining points.

In xerography or other electrostatographic applications, a charge retentive surface (such as on a photoreceptor belt or drum) is electrostatically charged with the corotron wire, and thereafter exposed to a light pattern of an original image to be reproduced to selectively discharge that surface. The resulting pattern of charged and discharged areas on the charge retentive surface forms an electrostatic charge pattern (an electrostatic latent image) conforming to the original image. The latent image is developed by contacting it with a finely divided electrostatically attractable powder referred to as "toner" Toner is held on the image areas by the electrostatic charge on the surface. Thus, a toner image is produced in conformity with a light image of the original being reproduced. The toner image may then be transferred to a substrate (e.g., paper), and the image affixed thereto to form a permanent record of the image to be reproduced. The process is well known, and is useful for light lens copying from an original, and printing applications from electronically generated or stored originals, where a charged surface may be discharged in a variety of ways.

It is common practice in electrophotography to use corona wire chargers to provide electrostatic fields driving various machine operations. In this manner, corona wires are used to deposit charge on the charge retentive surface prior to exposure to light, to implement toner transfer from the charge retentive surface to the substrate, to neutralize charge on the substrate for removal from the charge retentive surface, and to clean the charge retentive surface after toner has been transferred to the substrate. These corona charging devices normally incorporate at least one coronode wire held at a high voltage to generate ions or charging current to charge a surface closely adjacent to the device to a uniform voltage potential, and may contain screens and other auxiliary coronodes to regulate the charging current or control the uniformity of charge deposited. A typical configuration for a corotron corona charging device is to use a thin wire coronode tensioned between two insulating end blocks which support the coronode in charging position with respect to the photoreceptor and also serve to support connections to the high voltage source required to drive the coronode to corona producing conditions. The coronode may be partially enclosed by a conductive shield and held at ground potential so as to increase the corona current produced. The wire coronode may also be coated, so as to form a dielectric coronode.

It is often desirable to have two coronodes within the same structure, a series of wires, or a continuous wire spanning the charging zone, so as to increase charging zone width, uniformity or intensity or otherwise enhance coronode performance. A single wire, doubled back and forth may be used (such as shown in U.S. Pat. No. 3,499,143 to Martin), having free ends of the wire anchored at one end or one side of the retaining block, one or more spanning loops, and the other end anchored at an opposite (or same) end or side of the block. It is common in wire coronode structures to provide a spring connector to anchor an end of the coronode to an insulating end block.

Scorotron corona charging devices have a similar structure, but are characterized by a conductive screen or grid interposed between the coronode and the photoreceptor surface, and held at a voltage corresponding to the desired charge on the photoreceptor surface. The screen tends to share the corona current with the photoreceptor surface. As the voltage on the photoreceptor surface increases towards the voltage level of the screen, corona current flow to the screen is increased, until all the corona current flows to the screen and no further charging of the photoreceptor takes place. It is to be noted that it is desirable that the screen be supported in a rigid, flat manner, so that it is uniformly spaced from the photoreceptor.

Some end block assemblies include a member that is moved into abutment with the bead to apply an adjustable tensioning force to the coronode. In use, wire coronode corotrons and scorotrons are noted for the ability to produce a reasonably uniform charge on a charge retentive surface. However, over time, the environment to which the coronode is exposed begins to cause irregularities and degradation in charging uniformity. These irregularities may be traced to surface irregularities on the coronode surface which over time becomes pitted, or coated with toner or fuser release agent or other process byproducts which must be removed. While cleaning the coronode serves to improve the charging characteristics, coronodes eventually require replacement due to further degradation in performance, or breakage which often occurs while cleaning.

Installing a new corotron wire or correcting the problem of degraded or broken corotron wire can present a series of difficulties for technicians, as discussed above. The tensioning of the corotron wire against a spring bias can be a delicate operation, as can preventing the ends of the wire slipping from the installers (often pliers) grasp. In most cases, care must also be taken to avoid damage to the wire during installation, which can result in uneven charging that would effect copy or print quality after the wire is placed into the machine. The use of pliers, hooks, screwdrivers and other tools to pull the wire taut may work, but is difficult and may break or damage the wire.

In the past a variety of arrangements have been used to install, support and/or anchor coronodes, corotron wires and scorotron wires in position within a photoreceptor charging device, including the following disclosures that may be relevant:

U.S. Pat. No. 5,074,484

Patentee: Kray

Issued: Dec. 24, 1991

U.S. Pat. No. 4,764,675

Patentee: Levy et al.

Issued: Aug. 16, 1988

U.S. Pat. No. 4,754,305

Patentee: Fantuzzo et al.

Issued: Jun. 28, 1988

U.S. Pat. No. 4,258,258

Patentee: Laing et al.

Issued: Mar. 24, 1981

U.S. Pat. No. 4,118,751

Patentee: Hubble, III et al.

Issued: Oct. 3, 1978

U.S. Pat. No. 4,112,298

Patentee: Welkel, Jr.

Issued: Sep. 5, 1978

U.S. Pat. No. 4,110,811

Patentee: Hubble, Ill et al.

Issued: Aug. 29, 1978

U.S. Pat. No. 4,099,219

Patentee: Laing

Issued: Jul. 4,1978

U.S. Pat. No. 3,499,143

Patentee: Martin

Issued: March 3, 1970

U.S. Pat. No. 5,074,484 teaches a corotron restringing tool that includes a locking drum downstream from a spool of corotron wire to be strung between points. A torsion spring connected to the locking drum allows the wire to be drawn from the spool under a minimum of tension and subsequently manipulated without placing tension on the remaining wire on the spool.

U.S. Pat. No. 4,764,675 discloses a charging device provided with an integral arrangement for tensioning coronodes. The device is used to mount a double length prefabricated wire coronode having connectors at each end. The device includes insulating end blocks supporting the coronode in at least one of the end blocks adaptable for electrically connecting the coronode to a power supply, and a coronode support member for applying tension to the coronode.

U.S. Pat. No. 4,754,305 teaches a corona discharge device including a throwaway subassembly installed into the printing machine, and includes a rectangular-shaped insulative frame and a tungsten wire. When the subassembly is inserted into the machine, it cooperates with a U-shaped, conductive shield.

U.S. Pat. No. 4,258,258 discloses one end of a coronode provided with a bead termination and supported within a channel, while the other end extends through an insert to a tensioning means. Cooperating collars retain the coronode end in the insert against any force pulling it out of the insert; nonconductive inserts are seated in the spaces in the end block assemblies and surrounding the electrode. These nonconductive inserts are made of a material with high dielectric strength and resistant to corrosive atmosphere.

U.S. Pat. No. 4,118,751 teaches a corona discharge device having a coronode of the type including a wire electrode coated with a fractureable dielectric sleeve for example, glass. Electrical contact is made to the wire via a conductive member forcibly attached or crimped to the sleeve to fracture it sufficiently to permit direct contact between the wire and the member.

U.S. Pat. No. 4,112,298 discloses a corona generating device including an electrically biased corona emitting wire supported near its ends by insulating end blocks. One of the blocks has a recess which houses a coil spring through which the wire passes coaxially. The wire is attached to a mass which bears against the loaded coil spring to maintain the wire in a taut condition.

U.S. Pat. No. 4,110,811 teaches a coronode in the form of a wire supported between insulating end block assemblies. Each assembly is constructed of mating half-sections which jointly define a substantially closed and insulated cavity lined with a conductive insert. The coronode is held taut by means of a loaded compression spring carried within the insert on the half-section removed from the high voltage supply, the spring bearing against the conductive insert on one end and against a second conductive bead carried by the other end of the coronode.

U.S. Pat. No. 4,099,219 discloses a coronode in the form of a wire supported between insulating end block assemblies; a thin wire coated coronode includes a dielectric coating which may be formed into enlarged beads adjacent the ends thereof. The coronode beads rest jointly on the floors of the cavities provided in each end block assembly and may also be supported on a tin pedestal or elongated support which spans the end block assemblies. One end block assembly includes a member movable into abutment with the bead to apply an adjustable tensioning force to the coronode.

U.S. Pat. No. 3,499,143 discloses a charger for use with electrostatic copying machines in which the corona wire is renewable or resuppliable when it becomes sufficiently defective. A supply of corona wire of indefinite length mounted on the charger for which one or more runs of fresh wire can be periodically withdrawn with provision for releasably holding the wire under tension during periods of use.

In accordance with one aspect of the present invention, there is provided a tool for stringing a tensioned wire between an anchor point and a retaining point, including a sleeve having a first end and a second end and a pin slidably mounted within the sleeve. The pin has a retractable tip protrudable from the first end of the sleeve for holding a loop of the tensioned wire adjacent to the retaining point prior to transfer of the tensioned wire to the retaining point; the tip retracts into the sleeve and the wire loop moves onto the retaining point in response to the tip engaging the retaining point.

These and other aspects of the invention will become apparent from the following description used to illustrate a preferred embodiment of the invention read in conjunction with the accompanying drawings in which.

Figure 1:
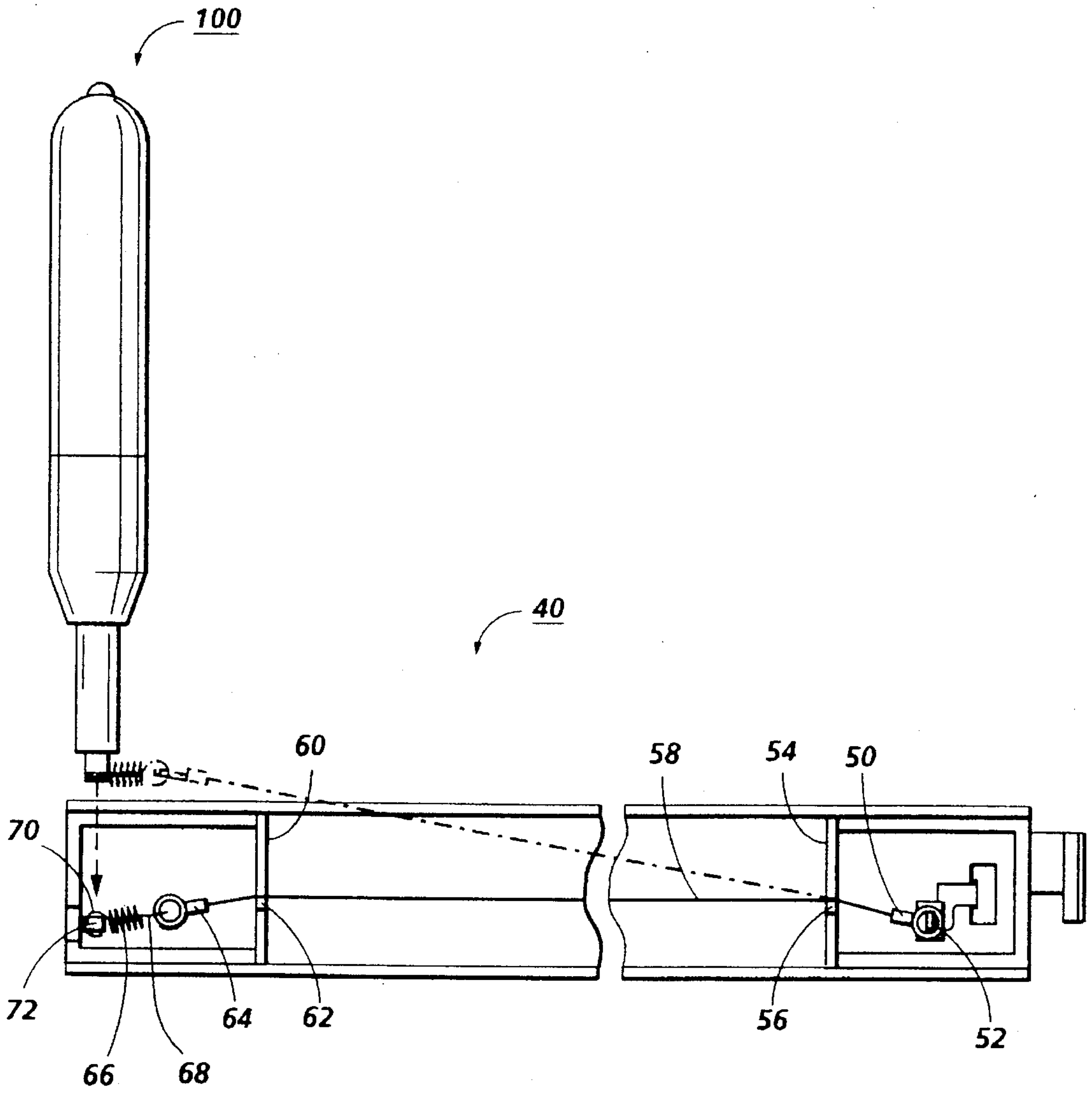
FIG. 1 is an elevational view showing a wire installation tool in accordance with an aspect of the present invention, combined with a plan view of a corotron mounting assembly.

While the present invention will hereinafter be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like references have been used throughout to designate identical elements. It will become evident from the following discussion that the present invention and the various embodiments set forth herein are suited for use in a wide variety of printing and copying systems, and are not necessarily limited in its application to the particular systems shown herein.

Referring now to the drawings, FIG. 1 shows a side view of wire tool 100, being used to place a corotron wire on a corotron wire assembly 40. Corotron wire assembly 40 is shown in an overhead view in FIG. 1 (rotated forward 90° relative to wire installing position of tool 100), for purposes of clarifying its elements. Corotron wire assembly 40 includes a corotron wire 58 having loop 50 around retaining post 52; retaining post 52 is attached to assembly block 54 of corotron wire assembly 40. Wire 58 and spring 66 are being held in position by tool 100 across the span defined by notches 56 and 62. (Corotron wire 58 and spring 66 are also shown in phantom in FIG. 1, such as they would be positioned relative to corotron wire assembly 40 prior to installation on retaining pin 72.) End 64 of corotron wire 58 is attached to spring 66 at loop 68; the distant end of spring 66 will be attached using tool 100 to corotron wire retaining end 60 via loop 70, which is fitted over retaining tip 72 attached to assembly block 60. Installation tool 100 as shown in FIG. 1 permits an installer to tension corotron wire 58 by installing the tip of tool 100 into loop 70, and by actuating tool 100, to move loop 70 onto retaining pin 72.

Figures 2, 2A:
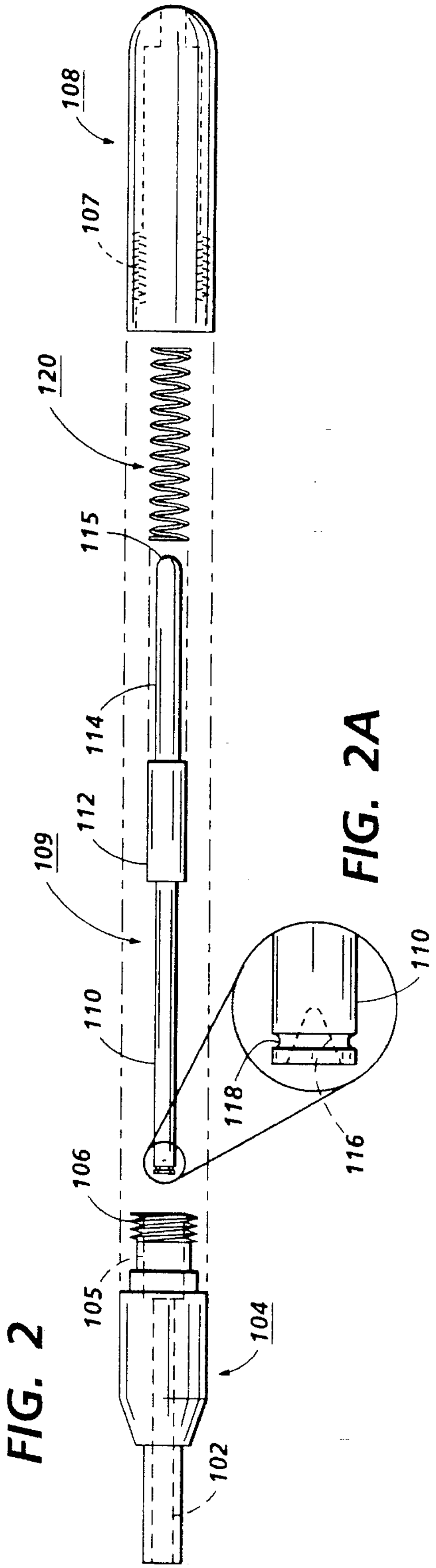
FIG. 2 is an exploded view of the wire installation tool shown in FIG. 1.
FIG. 2A is an enlarged tip view of the wire installation tool shown in FIG. 2.

FIGS. 2 and 2A shows a disassembled view of installation tool 100. (Installation tool 100 may be constructed of metal, plastic or other materials, and may be molded, cast or otherwise formed to result in the assembled embodiments shown and described herein.) Sleeve 102 and lower gripping portion 104 are included at the insertion end portion of tool 100; threads 105 mate with threaded region 107 of upper gripping portion 108, so as to connect lower gripping portion 104 to upper gripping portion 108. A cylindrical hole runs through the length of lower gripping portion 104 and upper gripping portion 108, and houses internal pin 109. Internal pin 109 includes tip 110, center enlarged portion 112, upper portion 114 and push tip 115. Spring 120 surrounds upper portion 114 of internal pin 109, and is compressed between enlarged portion 112 of internal pin 109 and the enlarged area of the cylindrical hole in upper gripping portion 108. Spring 120 biases tip 110 of internal pin 109 to protrude from the end of sleeve 102 of lower gripping portion 104. When lower gripping portion 104, upper gripping portion 108, spring 120 and internal pin 109 of tool 110 is assembled together as shown in FIG. 1, push tip 115 of internal pin 109 protrudes from the cylindrical hole at the end of upper gripping portion 108. The user of tool 100 may exert force on push tip 115 to assist spring 120 in pushing tip 110 of internal pin 109 outside of sleeve 102. An enlarged view of tip 110 is also shown in FIG. 2, with divot 116 at the end of tip 110, and notch 118 around the circumference of tip 110 (for holding loop 70 in place on tip 110 before it is transferred onto retaining pin 72, as shown in FIGS. 3A through 3D).

Figure 3A:
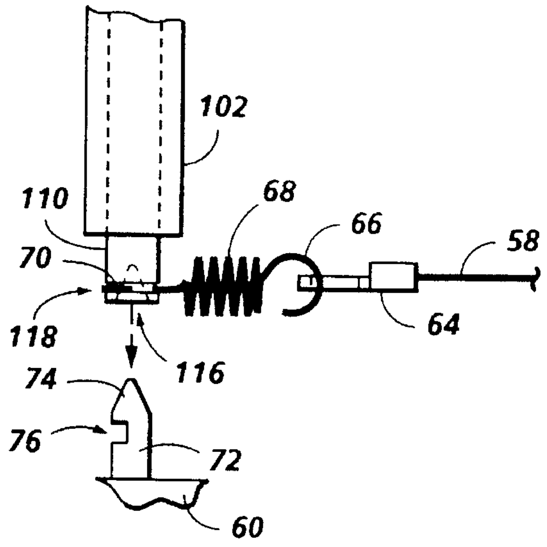
FIG. 3A is an enlarged elevational view showing the tip of the wire installation tool as shown in FIG. 1 prior to installation of the wire on a retaining pin.

FIG. 3A shows installation tool 100 as shown in FIGS. 1 and 2, with loop 70 of spring 68 in preinstallation position in notch 118 around the tip 110 of tool 100; tip 110 (retractable inside sleeve 102, as will be shown in FIG. 3C) is positioned above retaining pin 72. Corotron wire 58 is stretched taut by the user against the bias of spring 68, so as to span the distance between retaining post 52 and retaining pin 72 as shown in FIG. 1. Divot 116 in tip 110 of internal pin 109 is positioned over tip 74 of retaining pin 72; this placement of divot 116 over tip 74 aligns loop 70 with retaining pin 72 prior to wire 58 transfer. (The elements found in FIGS. 3B through 3D are identical to those shown in FIG. 3A, and are thus described below according to the numbered elements shown in FIG. 3A.)

Figure 3B:
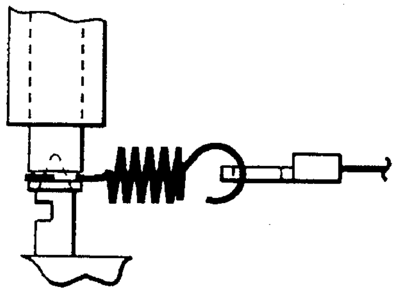
FIG. 3B is an enlarged elevational view showing the tip of the wire installation tool as shown in FIG. 1 positioned over the retaining point.
Figure 3C:
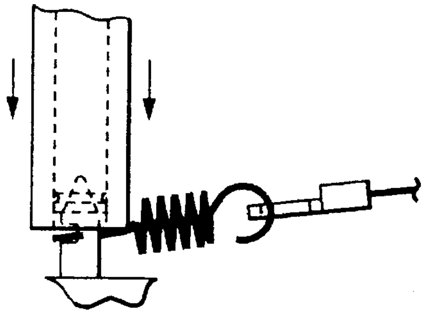
FIG. 3C is an enlarged elevational view showing the tip of the wire installation tool shown in FIG. 1 depressed on so as to move the loop end of the wire onto the retaining pin.

FIG. 3B shows tip 74 of retaining pin 72 mated with divot 116 in tip 110 of tool 100. FIG. 3C shows retaining sleeve 102 pushed down over the top of retaining pin 72, with loop 70 at the end of spring 68 pushed down over tip 110 until loop 70 lodges in notch 76 of retaining pin 72. FIG. 3C shows tool 100 depressed onto tip 74 of retaining pin 72, whereby tip 110 retracts inside sleeve 102 due to the exertion of force by the user according to the arrows shown. (Loop 70 need not be smaller than the outer diameter of sleeve 102 for tip 110 to function as desired, although this smaller loop 70 sizing may be desirable for certain embodiments.)

Figure 3D:
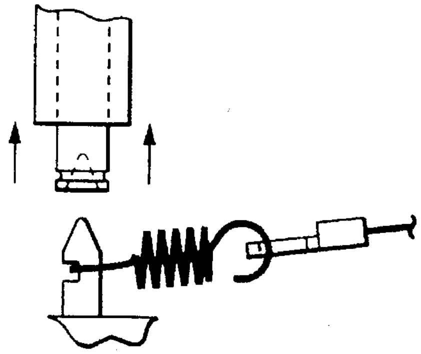
FIG. 3D is an enlarged elevational view showing the tip of the wire installation tool as shown in FIG. 1 after installation of the wire on the retaining pin.

FIG. 3D shows tool 100 being withdrawn from proximity to retaining pin 72 in the direction of the arrows shown, after installation of loop 70 into notch 76 of retaining pin 72. Tip 110 (biased by spring 120 and/or assisted by user force on push tip 115 as shown in FIG. 2) slides back outside of sleeve 102. as the user withdraws tip 110 of tool 100 from the area of retaining pin 72.

Figure 4:
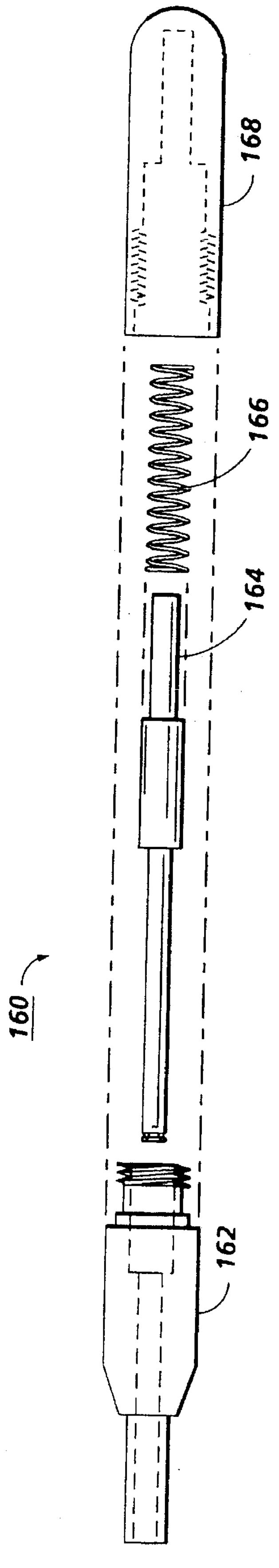
FIG. 4 is an exploded view of another embodiment of the wire installation tool in accordance with the present invention.

FIG. 4 shows an disassembled view another embodiment of the wire installation tool of the present invention. Tool 160 includes a lower gripping portion 162 having threads that mate with a threaded region of upper gripping portion 168. Internal pin 164 is enclosed inside cylindrical hole inside lower gripping portion 162 and upper gripping portion 168. Unlike push tip 115 of tool 100 as shown in FIG. 2, a tip of internal pin 164 opposite from the installation end of tool 160 shown in the FIG. 4 embodiment does not protrude from the end of upper gripping portion 168. Spring 166 surrounds upper portion 164 of internal pin 160, and is compressed between the enlarged portion of internal pin 160 and the enlarged area of the cylindrical hole in upper gripping portion 168, so as to bias the tip of internal pin 160 to protrude from lower gripping portion 104.

Figure 5A:
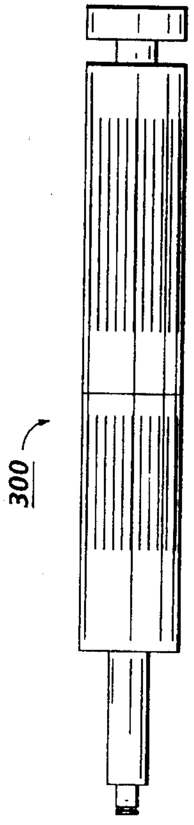
FIG. 5A is an elevational view of another embodiment of the wire installation tool in accordance with the present invention.
Figure 5B:
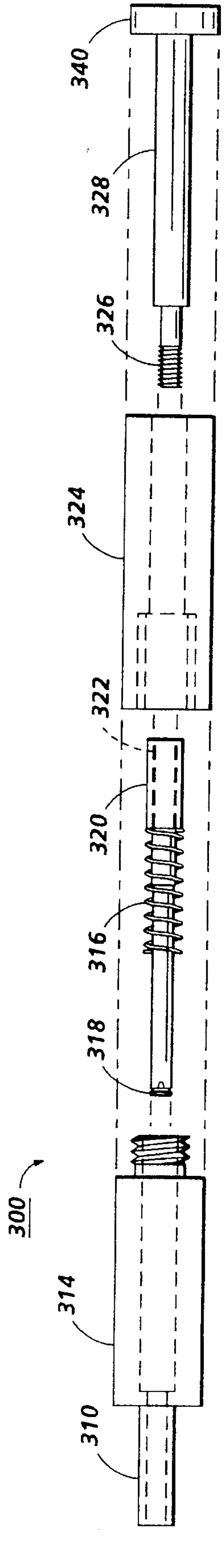
FIG. 5B is an exploded view of the wire installation tool shown in FIG. 5A.

FIGS. 5A and 5B, respectively, show an assembled and a disassembled view of an embodiment of wire installation tool 300 of the present invention. As shown in FIG. 5B, tool 300 includes sleeve 310 on a lower gripping portion 314. Threads on lower gripping portion 314 mate with a threaded region of upper gripping portion 324. The tip of the internal pin section 318 is normally biased by spring 316 to retract into tool 300. Spring 316 is compressed into position at one end by an internal stop in lower gripping portion 314 and at the other end by enlarged area 320 of internal pin section 318. Push pin section 324 of tool 300 has knob 340 protruding from the end of gripping portion 324 opposite sleeve 310. A threaded portion 326 of push pin section 324 mates with threads 322 of enlarged section 320 of internal pin section 318. The user can move the tip of internal pin section 318 into or out of sleeve 310 by pulling or pushing on knob 340 as push pin section 324 and internal pin section 318 slide within the internal cavity running the length of tool 300.

Figure 6:
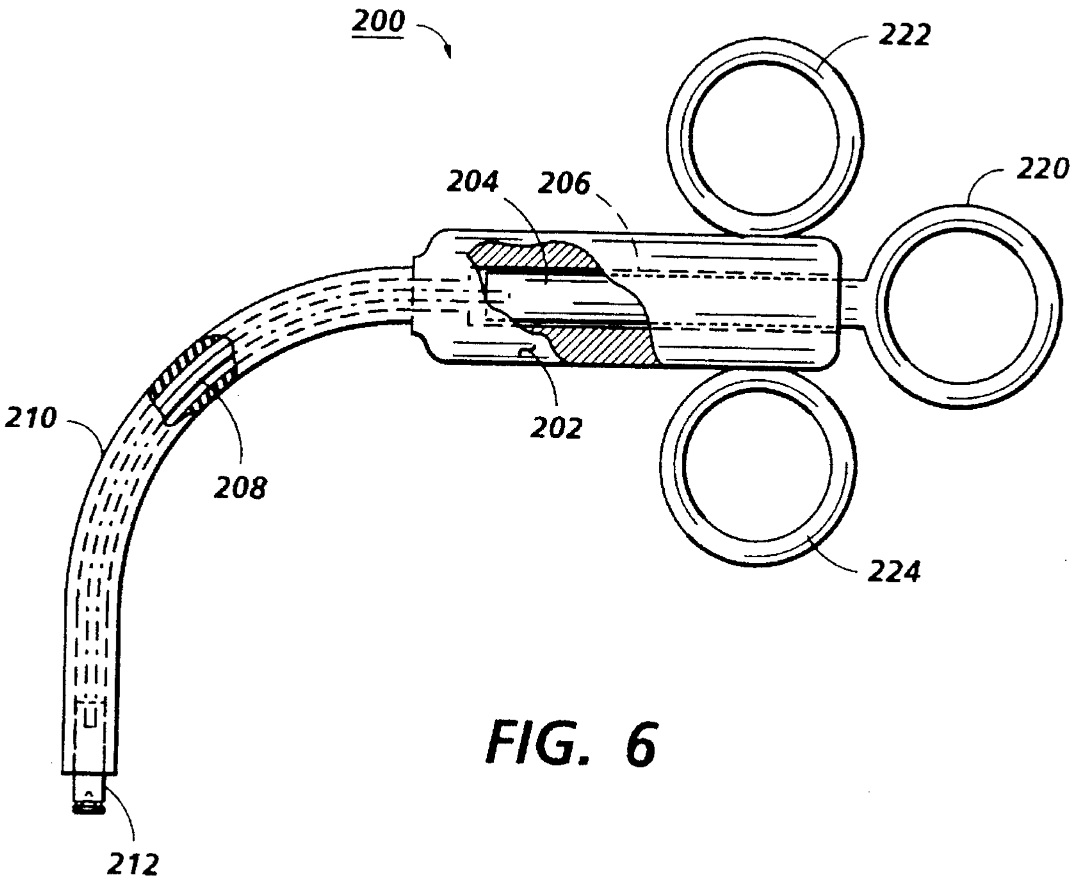
FIG. 6 is a side view, partially in section, of another embodiment of the wire installation tool in accordance with the present invention.

FIG. 6 shows another embodiment of the installation tool of the present invention. Tool 200 is shown having a flexible sleeve 210 with a flexible internal shaft 208 passing through it. Tip 212 is attached to the protruding end of flexible internal shaft 208. Flexible sleeve 210 permits the user of tool 200 to maneuver tip 212 into virtually any remote crevice in a copier, printer or other device so as to install a wire on or around a retaining member. Certain embodiments of tool 200 may employ a flexible sleeve 210 that retains a shape or curve once so positioned, while other embodiments of tool 200 may employ a flexible sleeve 210 that remains easily movable at all times. Upper tool body portion 202 includes two user finger loop handles 222 and 224, permitting the user to firmly grasp tool 200. Piston 204 is slidably mounted inside cylindrical cavity 206 of upper tool body portion 202, and is attached to the upper end of flexible internal shaft 208. By pushing or pulling on thumb loop handle 220 attached to the outer end of piston 204, the user is able to manipulate tip 212 in and out of flexible sleeve 210, such as while installing a wire loop on a retaining point according to the method previously shown and described in conjunction with FIGS. 3A through 3D or with other embodiments shown and described herein. Embodiments of the wire installation tool of the present invention (including tool 100 shown in FIG. 2, tool 300 shown in FIG. 5B, tool 200 shown in FIG. 6 or tool 350 shown in FIG. 7) may be used to string a single wire, doubled back and forth between points (similar to wire 30 or wire 56 as shown in FIG. 2 of U.S. Pat. No. 3,499,143 to Martin); each free end) or intermediate looping portion of a wire can be anchored at the ends or sides of a wire retaining member using one or more embodiments of the installation tool of the present invention.

Figure 7:
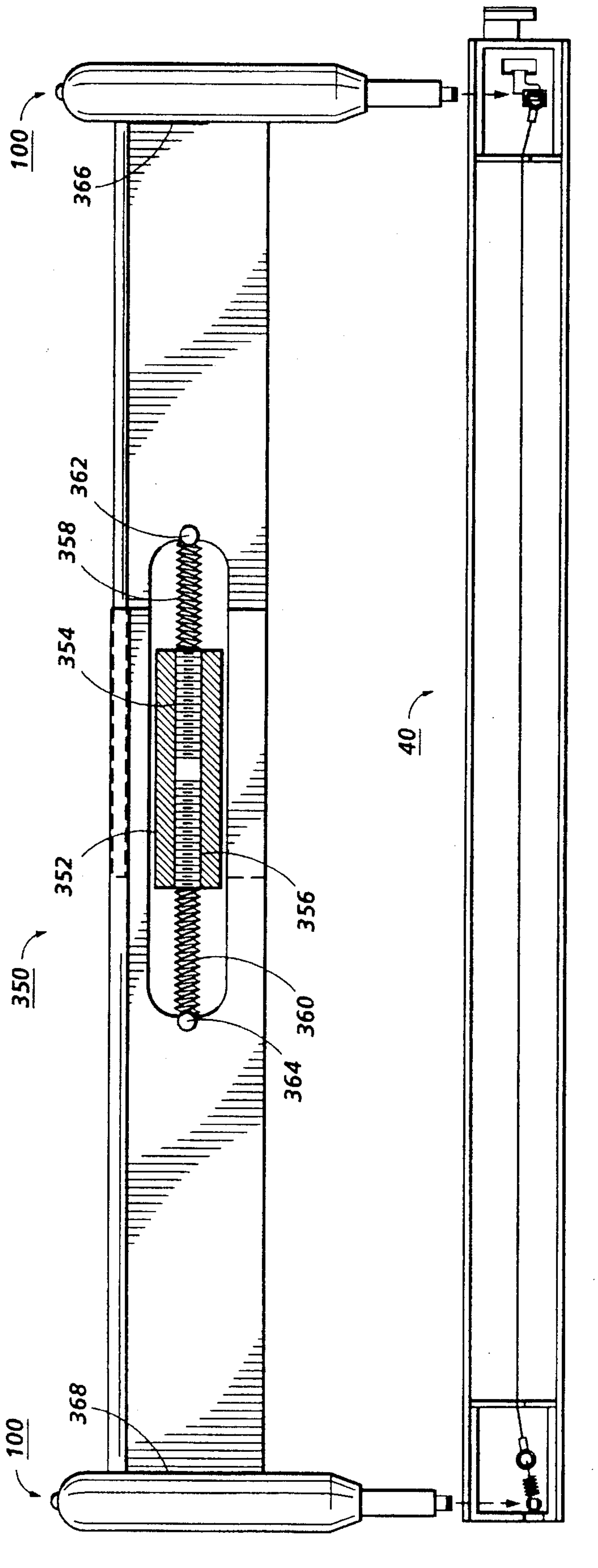
FIG. 7 is an elevational view, partially in section, of another embodiment of the wire installation tool in accordance with the present invention.

FIG. 7 shows slide assembly 350 that includes an installation tool 100 as shown in FIG. 2 at each end; a pair of tools 300 as shown in FIG. 5B or tools 200 as shown in FIG. 6 may similarly be employed at both ends of slide assembly 350. Alternatively, a single tool 100 as shown in FIG. 2, tool 300 as shown in FIG. 5B, or tool 200 as shown in FIG. 6 may be mounted at one end 366 of slide assembly 350, with a fixing pin, yoke or other means (not shown) to position opposite end 368 of slide assembly 350.

Slide assembly 350 as shown in FIG. 7 permits a user to simultaneously mount both looped ends of a corotron wire (with or without a tensioning spring) on corotron wire assembly 40 or across a like span. A first tool 100 is shown attached to end 366 of slide assembly 350; a second tool 100 is attached to end 368 of slide assembly 350. The two sliding body portions of slide assembly 350 are connected to each other such that the distance between first tool 100 and second tool 100 may be varied by rotating thumb wheel 352. Threaded member 358 is attached at one end to anchor point 362 of slide assembly 350 and at the other end to threaded region 354 of thumb wheel 352. Threaded member 360 is attached at one end to anchor point 364 of slide assembly 35, and at the other end to threaded region 356 of thumb wheel 352. Threaded member 358 and threaded region 354 have threads opposite from those found in threaded member 360 and threaded region 356, so that the distance between first tool 100 and second tool 100 may be increased by rotating thumb wheel 352 in one direction or decreased by rotating thumb wheel 352 in the other direction.

Figure 8A:
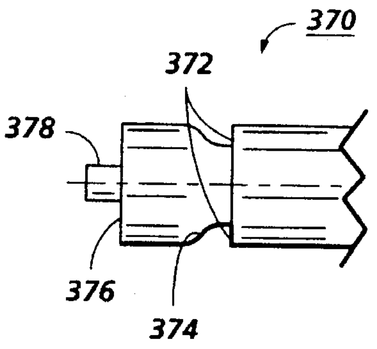
FIG. 8A is an enlarged elevational view showing an embodiment of a tip of the wire installation tool in accordance with the present invention.

FIG. 8A through 8D shows further embodiments of the tip to the wire installation tool of the present invention, such as may be employed with the tool 100 as shown in FIG. 2, tool 300 as shown in FIG. 5B, tool 200 as shown in FIG. 6 or tool 350 as shown in FIG. 7. FIG. 8A shows tip 370 having a pin 378 for mating with a hole or slot. Stop 376 prevents pin 378 from extending too far into the hole or slot while a wire or spring loop (not shown in FIGS. 8A through 8D is being transferred. Tapered region 374 permits a wire or spring loop (such as shown in FIGS. 3A through 3D) to easily slide from the end of tip 370, while stop 372 prevents the wire or spring loop from sliding up the shaft of tip 370.

Figure 8B:
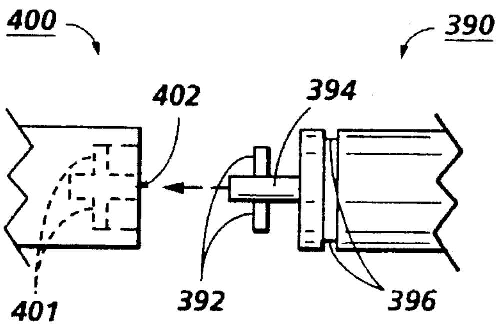
FIG. 8B is an enlarged elevational view showing an embodiment of a tip and mating end of the wire installation tool in accordance with the present invention.
Figure 8C:
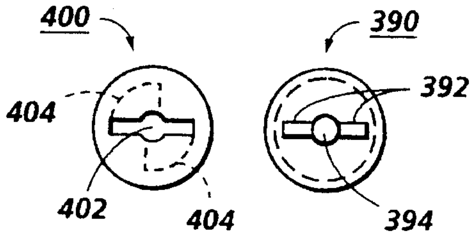
FIG. 8C is an enlarged elevational view showing a tip and mating end of the wire installation tool shown in FIG. 8B.

FIGS. 8B and 8C show another embodiment of the tip to the wire installation tool of the present invention, such as may be employed with the tool 100 as shown in FIG. 2, tool 300 as shown in FIG. 5B, tool 200 as shown in FIG. 6 or tool 350 as shown in FIG. 7. Tip 390 is shown in side view FIG. 8B and end view FIG. 8C having a pin 394 and cross pin 392 for mating with slot 402 of retaining pin 400. As pin 394 and cross pin 392 are inserted into slot 402 of retaining pin 400, tip 390 may be twisted in hollow region 404 (as shown in FIG. 8C) so as to lock cross pin 392 of tip 390 to retaining pin 400. In this manner, a secure connection is made such that a wire loop may be transferred to retaining pin 400 such as is shown in FIGS. 3A through 3D herein.

Figure 8D:
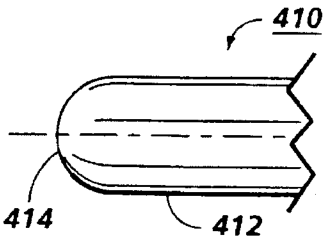
FIG. 8D is an enlarged elevational view showing an embodiment of a tip of a the wire installation tool in accordance with the present invention.

FIG. 8D shows another embodiment of the tip to the wire installation tool of the present invention, such as may be employed with the tool 100 as shown in FIG. 2, tool 300 as shown in FIG. 5B, tool 200 as shown in FIG. 6 or tool 350 as shown in FIG. 7. Tip 410 is shown in FIG. 8D having body 412 and a rounded tip 414; rounded tip 414 permits a wire or spring loop (such as shown in FIGS. 3A through 3D) to easily slide from the end of tip 410 onto a retaining pin or point.

While the present invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim:

1. A tool for stringing a tensioned wire between an anchor point and a retaining point, comprising:

a sleeve having a first end and a second end including a handle, said sleeve further including a pair of finger loops attached to an outer surface of said sleeve; and a pin slidably mounted within said sleeve and having a retractable tip protrudable from the first end of said sleeve for holding a loop of the tensioned wire adjacent to the retaining point prior to transfer of the tensioned wire to the retaining point, whereby said tip retracts into said sleeve and the wire loop moves onto the retaining point in response to the tip engaging the retaining point, said pin including a thumb loop attached to an end of said pin opposite the tip and protruding from the second end of said sleeve for variably positioning the tip of said pin relative to the first end of said sleeve.

2. A tool for stringing a tensioned wire between an anchor point and a retaining point, comprising:

a sleeve having a first end and a second end, the first end of said sleeve including a flexible portion; and a pin slidably mounted within said sleeve and having a retractable tip protrudable from the first end of said sleeve for holding a loop of the tensioned wire adjacent to the retaining point prior to transfer of the tensioned wire to the retaining point, whereby said tip retracts into said sleeve and the wire loop moves onto the retaining point in response to the tip engaging the retaining point, said tip of said pin including a flexible shaft, whereby said flexible shaft of said tip is variably retractable within said flexible portion of said sleeve.

* * * * *